(12) United States Patent
Fallone et al.

(10) Patent No.: US 7,900,037 B1
(45) Date of Patent: Mar. 1, 2011

(54) DISK DRIVE MAINTAINING MULTIPLE LOGS TO EXPEDITE BOOT OPERATION FOR A HOST COMPUTER

(75) Inventors: Robert M. Fallone, Lake Forest, CA (US); William B. Boyle, Lake Forest, CA (US); Young H. Lee, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 567 days.

(21) Appl. No.: 12/030,074

(22) Filed: Feb. 12, 2008

(51) Int. Cl.
*G06F 9/24* (2006.01)

(52) U.S. Cl. ............................. 713/2; 713/1; 711/163; 711/173

(58) Field of Classification Search .................. 713/1, 713/2; 711/163, 173
See application file for complete search history.

(56) References Cited

U.S. PATENT DOCUMENTS

| | | | |
|---|---|---|---|
| 5,713,024 A * | 1/1998 | Halladay | 717/168 |
| 5,966,732 A | 10/1999 | Assaf | |
| 6,073,232 A * | 6/2000 | Kroeker et al. | 713/1 |
| 6,098,158 A | 8/2000 | Lay et al. | |
| 6,539,456 B2 | 3/2003 | Stewart | |
| 6,662,267 B2 | 12/2003 | Stewart | |
| 6,904,496 B2 | 6/2005 | Raves et al. | |
| 6,968,450 B1 | 11/2005 | Rothberg et al. | |
| 6,993,649 B2 | 1/2006 | Hensley | |
| 7,107,444 B2 | 9/2006 | Fortin et al. | |
| 7,130,962 B2 | 10/2006 | Garney | |
| 7,181,608 B2 | 2/2007 | Fallon et al. | |
| 7,464,250 B2 * | 12/2008 | Dayan et al. | 711/217 |
| 2003/0135729 A1 | 7/2003 | Mason, Jr. et al. | |
| 2003/0142561 A1 | 7/2003 | Mason, Jr. et al. | |
| 2004/0064647 A1 | 4/2004 | DeWhitt et al. | |
| 2006/0294352 A1 | 12/2006 | Morrison et al. | |
| 2007/0005883 A1 | 1/2007 | Trika | |
| 2007/0083743 A1 | 4/2007 | Tsang | |
| 2007/0083746 A1 | 4/2007 | Fallon et al. | |
| 2008/0209198 A1 * | 8/2008 | Majni et al. | 713/2 |

OTHER PUBLICATIONS

Office Action dated Oct. 22, 2010 from U.S. Appl. No. 12/030,042, 12 pages.

\* cited by examiner

*Primary Examiner* — Thuan N Du

(57) ABSTRACT

A disk drive is disclosed wherein during a first boot operation, first boot data is transmitted from a first plurality of data sectors to a host, and a first log identifying the first plurality of data sectors is maintained. During a second boot operation, second boot data is transmitted from a second plurality of data sectors to the host, and a second log identifying the second plurality of data sectors is maintained. During a third boot operation, data sectors identified by the first and/or second logs are pre-fetched into a cache.

25 Claims, 6 Drawing Sheets

DISK DRIVE MAINTAINING MULTIPLE LOGS TO EXPEDITE BOOT OPERATION FOR A HOST COMPUTER

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 as comprising a number of data tracks 6 defined by servo sectors $4_0\text{-}4_N$ recorded around the circumference of each data track. Each servo sector $4_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $4_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

When a disk drive is installed into a host computer (e.g., a personal computer), an operating system (OS) is normally loaded onto the disk, after which the host computer may boot from the disk drive. Due to the mechanical latency of the disk drive (the seek latency of the actuator arm and the rotational latency of the disk) the boot operation may be undesirably long.

There is, therefore, a need for a disk drive which helps expedite the boot operation for a host computer.

DETAILED DESCRIPTION OF EMBODIMENTS OF THE INVENTION

Figure 1:
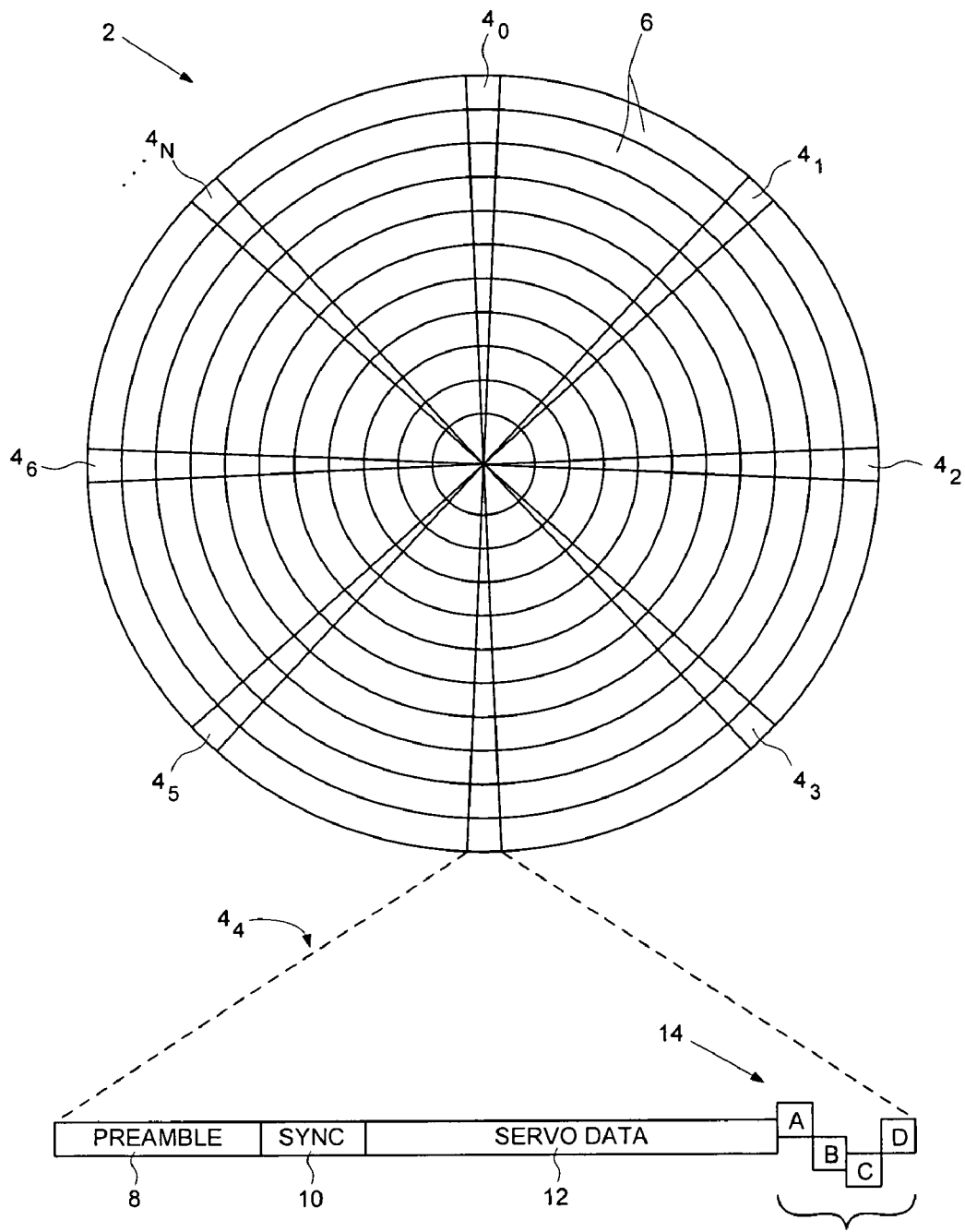
FIG. 1 shows a prior art disk format comprising a plurality of data tracks defined by a plurality of servo sectors.
Figure 2A:
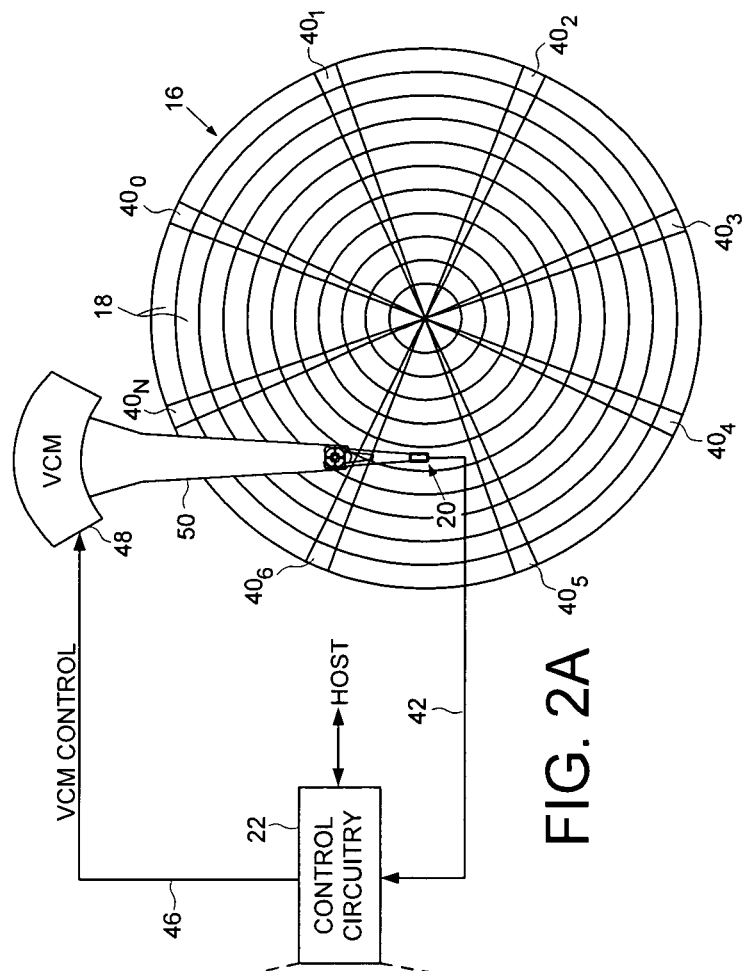
FIG. 2A shows a disk drive according to an embodiment of the present invention comprising a head actuated over the disk, and control circuitry.

FIG. 2A shows a disk drive according to an embodiment of the present invention comprising a disk 16 having a plurality of data tracks 18, wherein each data track comprises a plurality of data sectors. The disk drive further comprises a head 20 actuated over the disk 16, and control circuitry 22 operable to execute the flow diagram of FIG. 2B. During a first boot operation (step 24), first boot data is transmitted from a first plurality of data sectors to a host (step 26). A first log identifying the first plurality of data sectors may be maintained, for example, by detecting that the current boot sequence (step 28) correlates with the previous boot sequence (step 30). The first log may also be maintained by updating the log with any additions or changes based on the current boot sequence (step 32). If a new boot sequence is detected during a second boot operation (step 34), a second log is maintained (e.g., created (step 34)). During a third boot operation (step 36), data sectors identified by the first and second logs are pre-fetched into a cache (step 38).

In the embodiment of FIG. 2A, the disk 16 comprises a plurality of embedded servo sectors $40_0\text{-}40_N$ that define the data tracks 18. The control circuitry 22 processes a read signal 42 emanating from the head 20 to demodulate the embedded servo sectors $40_0\text{-}40_N$ and generate a position error signal (PES) representing a radial offset of the head 20 from a target track 18. The control circuitry 22 processes the PES with a suitable servo compensator to generate a control signal 46 applied to a voice coil motor (VCM) 48. The VCM 48 rotates an actuator arm 50 about a pivot in order to actuate the head 20 radially over the disk 16 in a direction that decreases the PES.

Figure 2B:
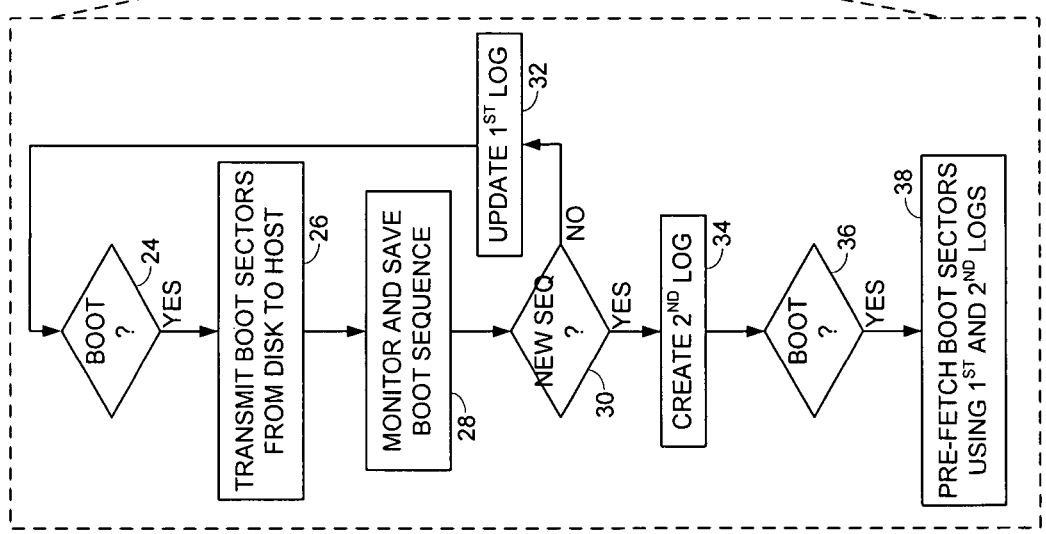
FIG. 2B is a flow diagram executed by the control circuitry according to an embodiment of the present invention wherein a plurality of logs are maintained and used to pre-fetch during boot operations.

Referring again to the flow diagram of FIG. 2B, a new boot sequence may be detected (step 30) in any suitable manner. In one embodiment, a new boot sequence is detected such that the second log is maintained if the second plurality of data sectors corresponding to the second boot operation does not match the first plurality of data sectors corresponding to the first boot operation. In another embodiment, the second log is maintained if a difference between the second plurality of data sectors and the first plurality of data sectors exceeds a threshold.

In another embodiment, a new log is created during each boot operation without detecting whether there is a new boot sequence. In this embodiment, when pre-fetching using the plurality of logs (step 38), data sectors identified by more than one log are pre-fetched only once. The number of logs created and maintained may be limited, for example, relative to a number of boot operations executed before the boot sequence typically changes. The number of logs maintained could be as few as two, or as many as tens, hundreds, or even thousands corresponding to as many boot operations. In one embodiment, when the number of logs is exhausted, the stalest log is overwritten.

The boot sequence may change for any suitable reason in the embodiments of the present invention. For example, the boot sequence may change if the disk drive stores multiple operating systems for the host, such as the Windows operating system and the Mac operating system, and the host may elect to boot from one or the other operating systems, for example, as configured by the user. In another embodiment, the first and second boot sequences may correspond to different modes of the same operating system, such as a high performance mode for a laptop plugged into a power supply, and a lower performance but better power conservation mode when the laptop is unplugged and operating on battery power. In yet another embodiment described below, a first boot sequence may correspond to an operating system stored by the disk drive, and a second boot sequence may correspond to a hibernate mode of the host. In one embodiment, the control circuitry 22 maintains a log for each detected boot sequence, and then during a boot operation, pre-fetches boot data using two or more of the logs into a cache. In this manner the boot data can be transmitted immediately when requested by the host, thereby avoiding the mechanical access latency of the disk drive.

In one embodiment, the control circuitry 22 pre-fetches boot data from data sectors identified by multiple logs at the beginning of a boot operation, and then pre-fetches only data sectors identified by the log that correlates with the data sectors being requested by the host. This embodiment is understood with reference to the flow diagram of FIG. 3 wherein after pre-fetching from a first and second log (step 38) the control circuitry 22 evaluates the pre-fetch data sectors that are being transmitted to the host to determine how they correlate with the logs (step 52). If the host is requesting data sectors that correlate with the first log, then the control circuitry continues pre-fetching boot data from the data sectors identified by the first log (step 54). If the host is requesting data sectors that correlate with the second log, then the control circuitry continues pre-fetching boot data from the data sectors identified by the second log (step 56). If the host is requesting data sectors that don't correlate with any of the logs, then the control circuitry updates one of the logs or creates a new log (step 58). The control circuitry may also identify changes to the first or second logs during the boot operation and update the logs accordingly (at step 54 or step 56).

The control circuitry 22 may evaluate the correlation between the host requested data sectors and the data sectors of the logs in any suitable manner. In one embodiment, the control circuitry 22 may determine there is a correlation if a number of cache hits corresponding to one of the logs exceeds a threshold. In another embodiment, the control circuitry 22 may determine there is a correlation if the host requests a particular data sector, or a particular range of data sectors (as determined by logical block addresses (LBAs) requested by the host). For example, the range of data sectors associated with a particular operating system or hibernate mode may be predetermined, and used by the control circuitry 22 to detect the correlation.

Figure 4A:
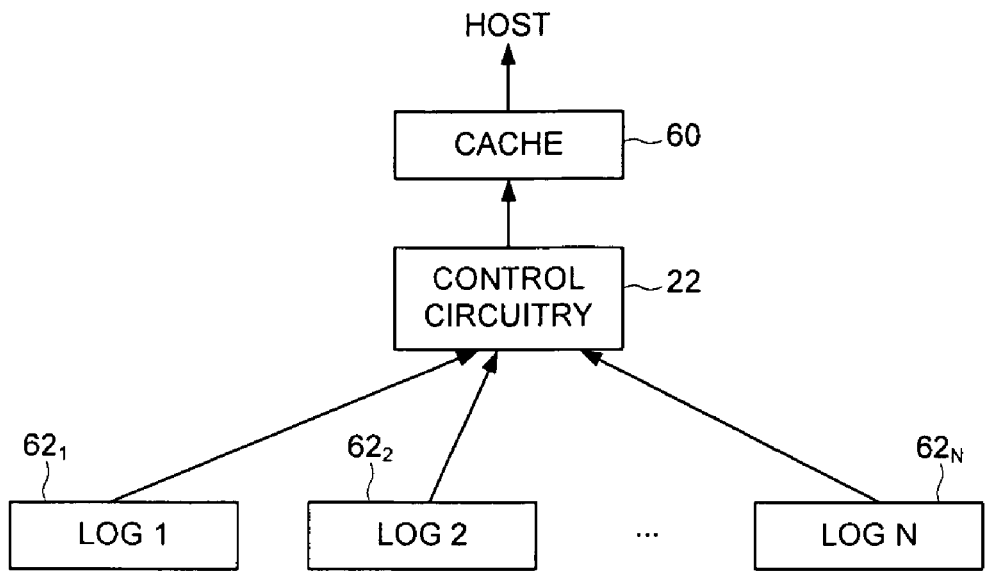
FIG. 4A illustrates an embodiment of the present invention where the control circuitry pre-fetches data sectors using a plurality of logs initially during a boot operation before receiving read commands from the host.
Figure 4B:
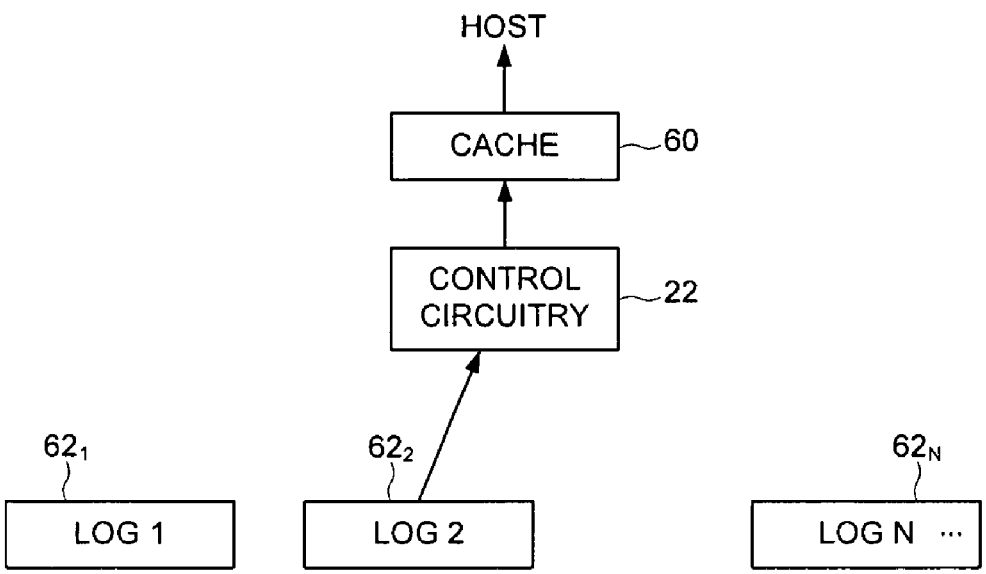
FIG. 4B illustrates an embodiment of the present invention where the control circuitry pre-fetches data sectors using a selected one of the logs that correlates with the data sectors transmitted to the host during the boot operation.

FIG. 4A illustrates an embodiment of the present invention wherein during a boot operation before receiving read commands from the host, the control circuitry 22 initially pre-fetches data sectors into a cache 60 using a plurality of logs ($62_1$-$62_N$). Once the control circuitry 22 begins receiving host commands and correlates the host commands with one of the logs (e.g., log $62_2$), the control circuitry 22 pre-fetches data sectors only from that log as illustrated in FIG. 4B.

Figure 5:
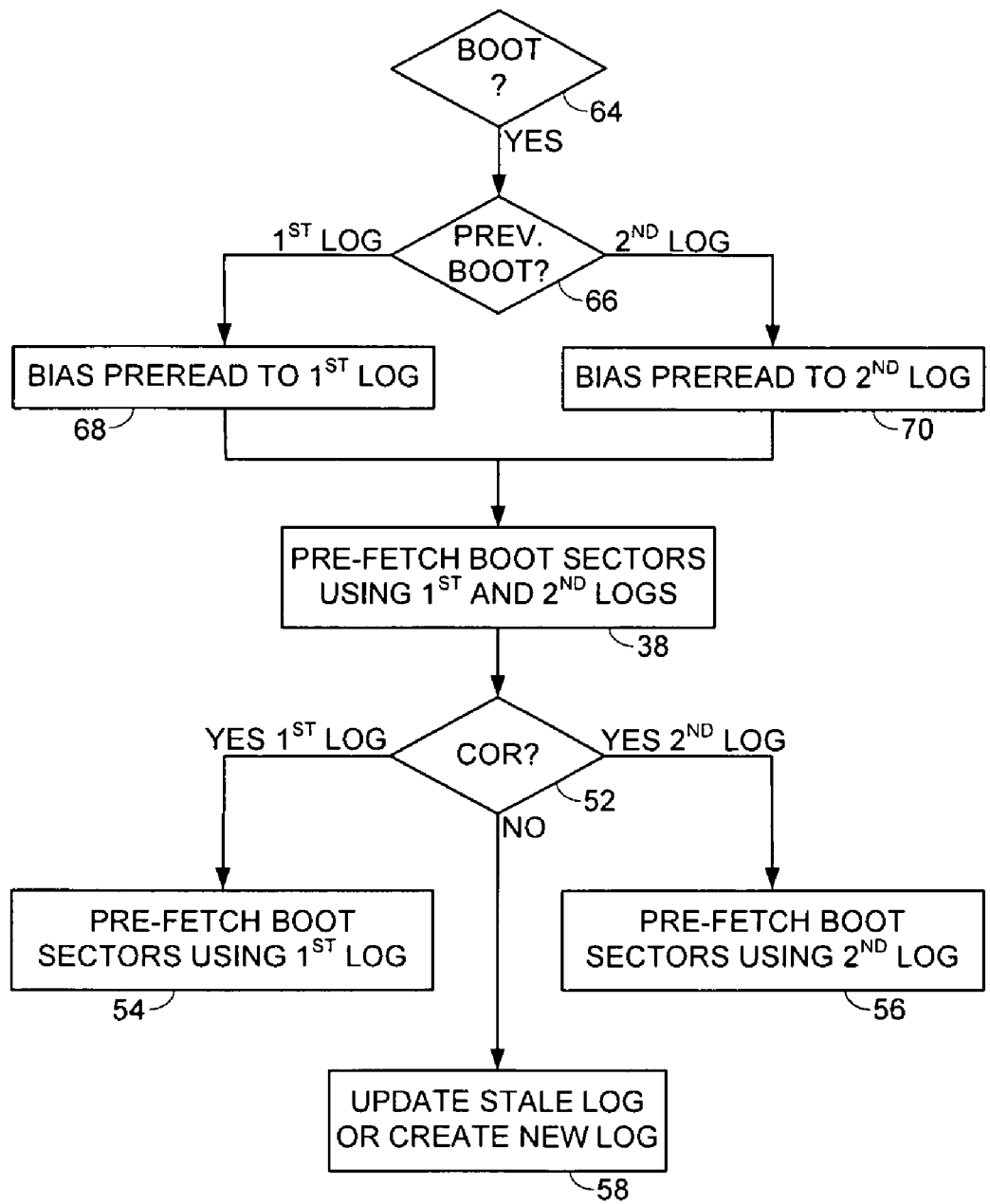
FIG. 5 is a flow diagram according to an embodiment of the present invention wherein the pre-fetching is biased toward the log used during the previous boot operation.

FIG. 5 is a flow diagram according to an embodiment of the present invention wherein during a current boot operation (step 64) the control circuitry 22 detects which log was selected during the previous boot operation (step 66), and then biases the pre-fetch operation toward that log (e.g., the first log (step 68) or a second log (step 70)). The amount of bias or ratio may be any suitable value, such as two data sectors from the previously log for every one data sector of a second log. The control circuitry 22 then pre-fetches data sectors from both logs (step 38) until the control circuitry 22 detects the correlation (step 52) of data sectors actually transmitted to the host during the current boot operation as described above.

Figure 6:
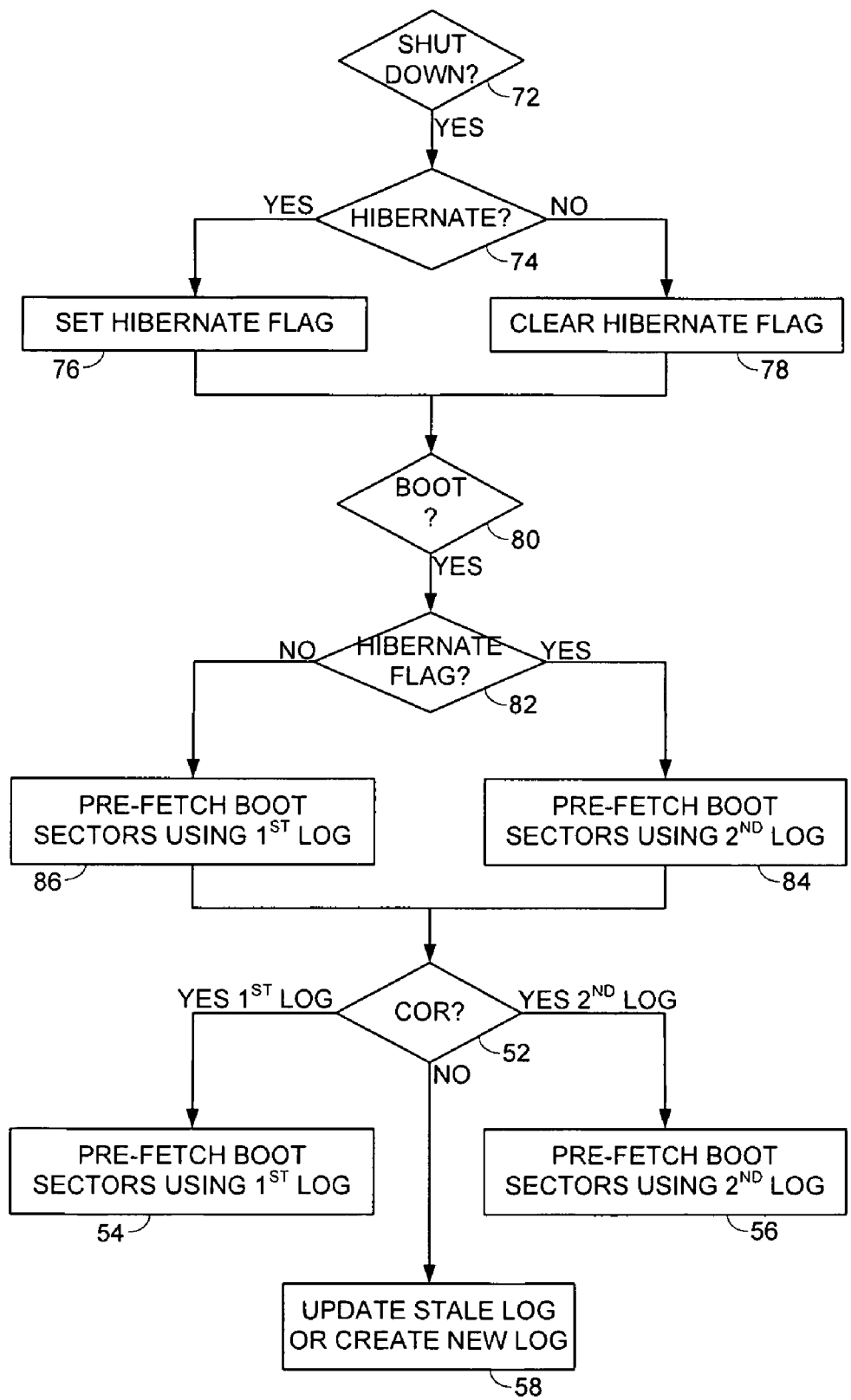
FIG. 6 is a flow diagram according to an embodiment of the present invention wherein if the host enters a hibernate mode during a shutdown operation, then during the next boot operation the control circuitry pre-fetches from the log corresponding to the hibernate mode.

In one embodiment, the host may enter a hibernate mode wherein the current state of the host is saved to a file of the disk drive prior to entering the hibernate mode. When the host awakens from the hibernate mode, the hibernate file is read from the disk drive in order to restore the host to its previous state rather than having to reload the operating system. In an embodiment shown in the flow diagram of FIG. 6, when the disk drive is preparing to shutdown (step 72) it detects whether the host is entering the hibernate mode (step 74). The disk drive may detect the hibernate mode in any suitable manner, such as by detecting that the host was writing to the hibernate file (e.g., a range of LBAs) just prior to the shutdown operation. In another embodiment, the host may transmit a command to the disk drive notifying the disk drive that the host is about to enter the hibernate mode. If the hibernate mode is detected, the control circuitry 22 sets a hibernate flag (step 76), otherwise the host clears the hibernate flag (step 78). If during a subsequent boot operation (step 80) the hibernate flag is set (step 82), then the control circuitry begins pre-fetching data sectors only from the log that correlates with the hibernate mode (step 84). Otherwise the control circuitry 22 pre-fetches data sectors from one or more of the other logs (step 86). After transmitting at least one data sector to the host, the control circuitry 22 selects the log that correlates with the transmitted data sectors as described above. For example, in one embodiment the host may enter the hibernate mode but then be forced to reload the entire operating system during a subsequent boot operation, which may be necessary under certain conditions, such as if the battery of a laptop runs down completely while in the hibernate mode, or if there is an error attempting to read the hibernate file.

Figure 3:
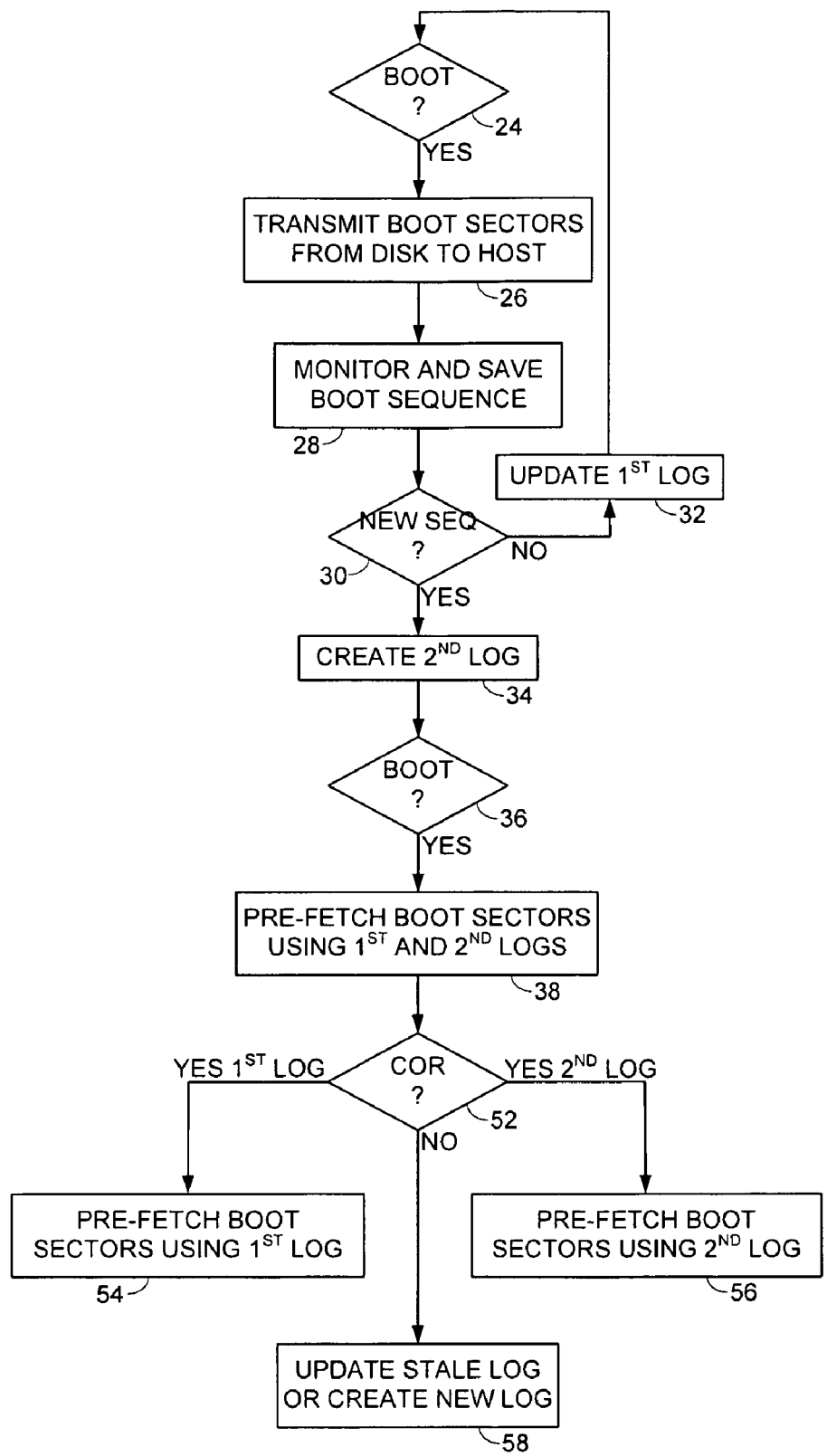
FIG. 3 is a flow diagram according to an embodiment of the present invention wherein during a boot operation the control circuitry pre-fetches from a log that correlates with the data sectors transmitted to the host.

In another embodiment, the control circuitry 22 may detect that the host was previously in the hibernate mode by detecting that the host is reading the hibernate file during a current boot operation (step 52 of FIG. 3). In this embodiment, the control circuitry 22 may pre-fetch data sectors from multiple logs until it determines that the host is requesting data sectors only from the hibernate file (e.g., by evaluating the LBAs requested by the host).

In yet another embodiment, the host may transmit a command to the disk drive indicating that it is about to begin writing to the hibernate file prior to entering the hibernate mode. The control circuitry may then monitor the sequence of data sectors written to the disk prior to the shutdown operation and maintain a corresponding log that may be used during a subsequent boot operation. Thus, in certain embodiments of the present invention, the control circuitry may maintain a log at times other than in connection with a boot operation.

Any suitable control circuitry 22 may be employed in the embodiments of the present invention, such as any suitable integrated circuit or circuits. For example, the control circuitry 22 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 22 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 22 comprises suitable logic circuitry, such as state machine circuitry.

What is claimed is:

1. A disk drive comprising:
a disk comprising a plurality of data tracks, wherein each data track comprises a plurality of data sectors;
a head actuated over the disk; and
control circuitry operable to:
transmit first boot data from a first plurality of data sectors to a host during a first boot operation;
maintain a first log identifying the first plurality of data sectors;
transmit second boot data from a second plurality of data sectors to the host during a second boot operation;
maintain a second log identifying the second plurality of data sectors; and
during a third boot operation, pre-fetch data sectors identified by the first and second logs into a cache.

2. The disk drive as recited in claim 1, wherein:
the first log corresponds to a first operating system for the host; and
the second log corresponds to a second operating system for the host.

3. The disk drive as recited in claim 1, wherein:
the first log corresponds to a first mode of an operating system for the host; and
the second log corresponds to a second mode of the operating system.

4. The disk drive as recited in claim 1, wherein the control circuitry is further operable to maintain the second log if the second plurality of data sectors does not match the first plurality of data sectors.

5. The disk drive as recited in claim 4, wherein the control circuitry is further operable to maintain the second log if a difference between the second plurality of data sectors and the first plurality of data sectors exceeds a threshold.

6. The disk drive as recited in claim 1, wherein during the third boot operation the control circuitry is further operable to:
transmit a number of the pre-fetch data sectors to the host; and
bias the pre-fetch operation toward the log that correlates with the transmitted pre-fetch data sectors.

7. The disk drive as recited in claim 1, wherein during the third boot operation the control circuitry is further operable to:
detect which log was accessed more frequently by the host during a previous boot operation; and
bias the pre-fetch operation toward the detected log.

8. The disk drive as recited in claim 1, wherein:
the first log corresponds to a first operating system for the host; and
the second log corresponds to a hibernate mode for the host.

9. The disk drive as recited in claim 8, wherein during the third boot operation the control circuitry is further operable to bias the pre-fetch operation toward the second log if the host previously entered the hibernate mode.

10. The disk drive as recited in claim 9, wherein prior to a shutdown operation the control circuitry is further operable to detect whether the host is entering the hibernate mode.

11. The disk drive as recited in claim 10, wherein the control circuitry detects whether the host is entering the hibernate mode based on the data sectors written to the disk prior to the shutdown operation.

12. The disk drive as recited in claim 8, wherein the control circuitry maintains the second log prior to a shutdown operation.

13. A disk drive comprising:
a disk comprising a plurality of data tracks, wherein each data track comprises a plurality of data sectors;
a head actuated over the disk; and
control circuitry operable to:
transmit first boot data from a first plurality of data sectors to a host during a first boot operation;
maintain a first log identifying the first plurality of data sectors;
transmit second boot data from a second plurality of data sectors to the host during a second boot operation;
maintain a second log identifying the second plurality of data sectors; and
during a third boot operation, pre-fetch data sectors from a selected one of the first and second logs into a cache.

14. A method of operating a disk drive, the disk drive comprising a disk comprising a plurality of data tracks, wherein each data track comprises a plurality of data sectors, and a head actuated over the disk, the method comprising:
transmitting first boot data from a first plurality of data sectors to a host during a first boot operation;
maintaining a first log identifying the first plurality of data sectors;
transmitting second boot data from a second plurality of data sectors to the host during a second boot operation;
maintaining a second log identifying the second plurality of data sectors; and
during a third boot operation, pre-fetching data sectors identified by the first and second logs into a cache.

15. The method as recited in claim 14, wherein:
the first log corresponds to a first operating system for the host; and
the second log corresponds to a second operating system for the host.

16. The method as recited in claim 14, wherein:
the first log corresponds to a first mode of an operating system for the host; and
the second log corresponds to a second mode of the operating system.

17. The method as recited in claim 14, further comprising maintaining the second log if the second plurality of data sectors does not match the first plurality of data sectors.

18. The method as recited in claim 17, further comprising maintaining the second log if a difference between the second plurality of data sectors and the first plurality of data sectors exceeds a threshold.

19. The method as recited in claim 14, further comprising during the third boot operation:
transmitting a number of the pre-fetch data sectors to the host; and
biasing the pre-fetch operation toward the log that correlates with the transmitted pre-fetch data sectors.

20. The method as recited in claim 14, further comprising during the third boot operation:
  detecting which log was accessed more frequently by the host during a previous boot operation; and
  biasing the pre-fetch operation toward the detected log.

21. The method as recited in claim 14, wherein:
  the first log corresponds to a first operating system for the host; and
  the second log corresponds to a hibernate mode for the host.

22. The method as recited in claim 21, further comprising during the third boot operation biasing the pre-fetch operation toward the second log if the host previously entered the hibernate mode.

23. The method as recited in claim 22, further comprising prior to a shutdown operation detecting whether the host is entering the hibernate mode.

24. The method as recited in claim 21, wherein the second log is maintained prior to a shutdown operation.

25. A method of operating a disk drive, the disk drive comprising a disk comprising a plurality of data tracks, wherein each data track comprises a plurality of data sectors, and a head actuated over the disk, the method comprising:
  transmitting first boot data from a first plurality of data sectors to a host during a first boot operation;
  maintaining a first log identifying the first plurality of data sectors;
  transmitting second boot data from a second plurality of data sectors to the host during a second boot operation;
  maintaining a second log identifying the second plurality of data sectors; and
  during a third boot operation, pre-fetching data sectors from a selected one of the first and second logs into a cache.

* * * * *